(12) United States Patent
Kubota et al.

(10) Patent No.: US 8,416,510 B2
(45) Date of Patent: Apr. 9, 2013

(54) IMAGING LENS

(75) Inventors: Yoji Kubota, Nagano (JP); Kenichi Kubota, Nagano (JP); Hitoshi Hirano, Nagano (JP)

(73) Assignee: Optical Logic Inc., Nagano (JP)

( * ) Notice: Subject to any disclaimer, the term of this patent is extended or adjusted under 35 U.S.C. 154(b) by 28 days.

(21) Appl. No.: 13/289,452

(22) Filed: Nov. 4, 2011

(65) Prior Publication Data

US 2012/0113533 A1    May 10, 2012

(30) Foreign Application Priority Data

Nov. 8, 2010 (JP) ................ 2010-249542

(51) Int. Cl.
*G02B 13/04* (2006.01)
*G02B 9/58* (2006.01)
*G02B 9/34* (2006.01)
*H04N 5/225* (2006.01)

(52) U.S. Cl. ......... 359/753; 359/782; 359/783; 348/340

(58) Field of Classification Search ............. 348/340; 359/749, 753, 781, 782, 783
See application file for complete search history.

(56) References Cited

U.S. PATENT DOCUMENTS

| 7,639,432 B2 * | 12/2009 | Asami | 359/770 |
| 7,746,572 B2 * | 6/2010 | Asami | 359/783 |
| 8,194,330 B2 * | 6/2012 | Yamakawa | 359/715 |
| 8,264,783 B2 * | 9/2012 | Peng et al. | 359/753 |

FOREIGN PATENT DOCUMENTS

JP    2003-307674 A    10/2003

* cited by examiner

*Primary Examiner* — David N Spector
(74) *Attorney, Agent, or Firm* — Kubotera & Associates, LLC

(57) ABSTRACT

An imaging lens includes a first lens group having a first lens that directs a concave surface to an image plane side and is negative; a second lens group having a second lens that directs a concave surface to an object side and is positive; an aperture; a third lens group having a third lens that is positive; and a fourth lens group having a joined lens that is composed of a fourth lens that is positive and a fifth lens that is negative. In the configuration, when the whole lens system has a focal length f and a composite focal length of the first lens group to the third lens group is Fa, the imaging lens satisfies the following relation:

$0.3 < f/Fa < 1.0$.

7 Claims, 15 Drawing Sheets

IMAGING LENS

BACKGROUND OF THE INVENTION AND RELATED ART STATEMENT

The present invention relates to an imaging lens for forming an image on an imaging element such as a CCD sensor and a CMOS sensor. In particular, the present invention relates to an imaging lens suitable for mounting in a relatively small camera such as a cellular phone, a digital still camera, a portable information terminal, a security camera, an onboard camera, and a network camera.

In these years, for a purpose of improving convenience and security, a plurality of cameras is mounted on a vehicle. For example, a vehicle may be equipped with a back camera to take a picture of a backside of the vehicle. In this case, a driver can see a situation behind the vehicle through a monitor when the vehicle is pulled back, so that even when there is an obstacle that is hard to see due to a blind side of the vehicle, it is possible to safely pull the vehicle back without contacting such an obstacle. There has been an expectation of increase in such a camera mounted on a vehicle, so-called onboard camera.

Usually, an onboard camera is often mounted in a relatively small space such as a backdoor, a front grill, a side mirror, or inside of the vehicle. Therefore, in addition to miniaturization, an imaging lens to be mounted in such an onboard camera is required to attain a higher resolution due to a large number of imaging elements and a wider imaging angle of a view to deal with a wider imaging range. However, it is difficult to attain miniaturization and the high resolution as well as the wider imaging angle of the view, while satisfactorily correcting respective aberrations. For example, if an imaging lens is configured to attain a smaller size, an individual lens has stronger refractive power, so that it is difficult to satisfactorily correct each aberration. For this reason, upon designing an actual imaging lens, it is a key to meet these demands in a balanced manner.

As an imaging lens with the wide imaging angle of the view, for example, Patent Reference has disclosed a conventional imaging lens. The conventional imaging lens is configured to include a first lens that with negative power and a shape of a meniscus lens directing a convex surface thereof to an object side; a second lens that is similarly negative power and is formed to have a shape of a meniscus lens directing a convex surface thereof to the object side; an aperture; a third lens that is biconvex; a fourth lens that has negative power and a shape of a meniscus lens directing a convex surface thereof to the object side; and a fifth lens that is biconvex, arranged in this order from the object side.

With the configuration described above, the imaging lens can attain a small size and satisfactorily correct aberrations by restraining within a certain range a ratio between a distance from a second principal point of a front group composed of the first and second lenses to the aperture and a distance from the second principal point of the front group to a first principal point of a rear group composed of the third through fifth lenses.

Patent Reference: Japanese Patent Publication No. 2003-307674

According to the conventional imaging lens described in Patent Reference, it is possible to attain a wider imaging angle of a view and also relatively satisfactorily correct aberrations although the number of lenses to compose the imaging lens is as few as five. However, since the total length of the lens system becomes long, the imaging lens does not meet the recent demands for miniaturization, and there remains an issue of attaining miniaturization of the imaging lens and satisfactory aberration correction in a good balance. Such an issue is not specific to the imaging lens to be mounted on an onboard camera, and is common among imaging lenses to be mounted on relatively small cameras such as cellular phones, digital still cameras, portable information terminals, security cameras, or network cameras.

In view of the problems of the conventional techniques described above, an object of the present invention is to provide an imaging lens that has a wider imaging angle of a view and can satisfactorily correct aberration in spite of a small size thereof.

SUMMARY OF THE INVENTION

In order to attain the object described above, according to the present invention, an imaging lens includes a first lens group having negative refractive power; a second lens group having positive refractive power; a third lens group having positive refractive power; and a fourth lens group, arranged in this order from an object side to an image plane side.

Furthermore, the first lens group is configured as a lens group having strongest refractive power among all the lens groups and is composed of one or a plurality of lenses directing a concave surface thereof to the image plane side. The second lens group is composed of one lens having a shape of a meniscus lens directing a concave surface thereof to the object side, and the fourth lens group is composed of two lenses, i.e., a lens having positive refractive power and a lens having negative refractive power.

When the whole lens system has a focal length f, and a composite focal length of the first lens group, the second lens group, and the third lens group is Fa, the imaging lens satisfies the following conditional expression (1):

$$0.3 < f/Fa < 1.0 \qquad (1)$$

According to the imaging lens having the above-described configuration, the first lens group that is disposed closest to the object side among all the lens groups is configured to have strongest refractive power among all the lens groups, so that the imaging lens has a configuration that is advantageous to enlarge an imaging angle of a view (wider angle). In addition, as shown in the conditional expression (1), according to the imaging lens of the invention, a composite refractive power of the three lens groups, i.e., the first lens group to the third lens group, account for a large part of the refractive power of the whole lens system. Accordingly, it is possible to suitably attain miniaturization of the imaging lens.

Here, when the imaging lens with the above configuration satisfies the conditional expression (1), it is possible to attain miniaturization of the imaging lens while restraining an incident angle of a light beam emitted from the imaging lens to an imaging element within a certain range.

As well known in the art, for light beams that an imaging element can take, a maximum incident angle is set as an incident angle limit in view of an imaging element structure. A light beam outside the range of the maximum incident angle may result in an image with a dark periphery due to a shading phenomenon. For this reason, it is necessary to restrain the incident angle from the light beam emitted from the imaging lens to the imaging element within the certain range.

In the conditional expression (1), when the value exceeds the upper limit "1.0", the composite refractive power of the first to the third lens groups becomes too strong. Accordingly, while it is advantageous for miniaturization of the imaging lens, it is difficult to restrain the incident angle of the light beam emitted from the imaging lens to the imaging element within the certain range. On the other hand, when it is below the lower limit "0.3", the composite refractive power of the first to the third lens groups becomes relatively weak. Accordingly, although it is easier to restrain the incident angle of the light beam emitted from the imaging lens to the imaging element within the certain range, it is difficult to attain miniaturization of the imaging lens.

Here, in order to restrain the incident angle of the light beam emitted from the imaging lens to the imaging element within the certain range, it is also effective to satisfy the following conditional expression (2) when the third lens group has a focal length F3:

$$1.0 < F3/f < 6.0 \quad (2)$$

In the conditional expression (2), when the value exceeds the upper limit "6.0", the third lens group has weak refractive power, so that it is difficult to restrain the incident angle of the light beam emitted from the imaging lens to the imaging element within the certain range. On the other hand, when it is below the lower limit "1.0", the third lens group has relatively strong refractive power. Accordingly, although it is easier to restrain the incident angle of the light beam emitted from the imaging lens to the imaging element within the certain range, it is difficult to restrain chromatic aberration within satisfactory range.

Furthermore, according to the invention, the first lens group and the second lens group are disposed to direct their concave surfaces to each other. Accordingly, it is possible to satisfactorily correct the curvature of the image surface. Among them, the second lens group has the shape also directing the convex surface thereof to the image plane side. Accordingly, it is also possible to satisfactorily correct distortion and chromatic aberration of magnification. Moreover, according to the invention, aberrations are corrected in the fourth lens group having weak refractive power as a whole. Accordingly, it is possible to satisfactorily correct aberrations such as a field curvature, a distortion, and a chromatic aberration. Here, the fourth lens group may be configured as a joined lens that is formed by joining a lens having positive refractive power and a lens having negative refractive power.

The imaging lens configured as described above preferably satisfies the following conditional expression (3) when the first lens group has the focal length F1:

$$-3.0 < F1/f < -1.0 \quad (3)$$

When the imaging lens with the configuration described above satisfies the conditional expression (3), it is possible to attain the wider imaging angle of the view while attaining miniaturization. In addition, when the imaging lens satisfies the conditional expression (3), it is also possible to restrain chromatic aberration within a satisfactory range, while restraining an incident angle to the imaging element within a certain range.

In the conditional expression (3), when the value exceeds the upper limit "−1.0", the first lens group has relatively strong refractive power, which is advantageous for the wider imaging angle of the view in the imaging lens. At the same time, a back focus becomes long, so that it is difficult to miniaturize the imaging lens. Furthermore, the off-axis chromatic aberration of magnification is insufficiently corrected (that of a short wavelength increases in a minus direction in relative to that of a reference wavelength), which makes it difficult to obtain satisfactory imaging performance.

On the other hand, when the value is below the lower limit "−3.0", the first lens group has relatively weak refractive power, which is advantageous for miniaturization of the imaging lens and restraining of the chromatic aberration of magnification. At the same time, since the position of the principal point becomes close to the image plane side, it is difficult to secure a sufficient back focus. Moreover, it is also difficult to restrain the incident angle of the light beam emitted from the imaging lens to the imaging element within the certain range.

According to the imaging lens with the configuration described above, in order to suitably restrain generation of curvature of the image surface and distortion, the first lens group is preferably configured using two lenses that have shapes of meniscus lenses directing concave surfaces thereof to the image plane.

In addition, the imaging lens configured as described above preferably satisfies the following conditional expression (4) when the second lens group has the focal length F2:

$$2.0 < F2/f < 25 \quad (4)$$

When the imaging lens with the configuration describes above satisfies the conditional expression (4), it is possible to restrain the field curvature within satisfactory range while restraining the chromatic aberration of magnification. When the value exceeds the upper limit "25", the second lens group has relatively weak refractive power and the off-axis chromatic aberration of magnification is insufficiently corrected. In addition, it is also difficult to restrain the field curvature and the astigmatism within satisfactory ranges.

On the other hand, when the value is below the lower limit "2.0", the second lens group has relatively strong refractive power, which is advantageous for restraining the chromatic aberration of magnification. At the same time, the axial chromatic aberration is insufficiently corrected, and it is difficult to obtain satisfactory imaging performance. Moreover, it is also difficult to secure a sufficient back focus.

The imaging lens configured as described above preferably satisfies the following conditional expression (5) when, of the lenses of the fourth lens group, the lens having positive refractive power has a focal length fp and a lens having negative refractive power has a focal length fn:

$$0.5 < |fp/fn| < 2.0 \quad (5)$$

When the imaging lens with the configuration describes above satisfies the conditional expression (5), it is possible to satisfactorily correct the chromatic aberration and restrain the field curvature within satisfactory range. If the value exceeds the upper limit "2.0", the lens having negative refractive power in the fourth lens group has relatively strong refractive power and the off-axis chromatic aberration is excessively corrected. Furthermore, the spherical aberration and the field curvature are excessively corrected, so that it is difficult to restrain those aberrations within satisfactory ranges.

On the other hand, when the value is below the lower limit "0.5", the axial and off-axis chromatic aberrations are insufficiently corrected and the field curvature increases, so that it is difficult to obtain satisfactory imaging performance also in this case.

The imaging lens configured as described above preferably satisfies the following conditional expression (6) when, of the lenses of the fourth lens group, the lens having positive refractive power has an Abbe's number vdp and the lens having negative refractive power has an Abbe's number vdn:

$$20 < vdp - vdn \quad (6)$$

When the imaging lens with the configuration describes above satisfies the conditional expression (6), it is possible to restrain the chromatic aberration within satisfactory range. When the value is outside the range of the conditional expression (6), both the axial chromatic aberration and the chromatic aberration of magnification are insufficiently corrected, so that it is difficult to restrain the chromatic aberrations within satisfactory range. Here, even when the Abbe's numbers of the lenses in the fourth lens group are outside the range of the conditional expression (6), it is still possible to correct the chromatic aberration. In this case, however, the astigmatic difference increases and the spherical aberration and the field curvatures are excessively corrected (curved to the image plane), so that it is difficult to obtain satisfactory imaging performance.

The imaging lens configured as described above preferably includes the fourth lens group composed of a lens having positive refractive power and a lens having negative refractive power, arranged in the order from the object side and satisfies the following conditional expression (7):

$$\nu dp > \nu dn \quad (7)$$

According to the imaging lens with the configuration described above, when the imaging angle of the view is widened, the first lens group tends to have stronger refractive power. The chromatic aberration of magnification incurred in the first lens group may be corrected by the second and the third lens groups, but when the first lens group has strong refractive power, there remains a concern that such correction may be insufficient.

In order to obtain high imaging performance in a lens system having a wide imaging angle of view, it is necessary to satisfactorily correct those chromatic aberration of magnification and axial chromatic aberration. For this reason, the lens having negative refractive power in the fourth lens group in the invention is disposed on the image plane side, and has smaller Abbe's number than that of the lens having positive refractive power, as shown in the conditional expression (7). With such configuration, the chromatic aberration of magnification incurred in the first lens group is satisfactorily corrected and generation of distortion is also suitably restrained.

According to the imaging lens of the invention, it is possible to attain an imaging lens with a wider imaging angle of view and satisfactorily corrected aberrations, and it is possible to provide a small-sized imaging lens with satisfactorily corrected aberrations.

DETAILED DESCRIPTION OF PREFERRED EMBODIMENTS

Hereunder, referring to the accompanying drawings, an embodiment of the present invention will be fully described.

FIGS. 1, 4, 7, 10, and 13 are sectional views of image lenses in Numerical Data Examples 1 to 5 according to the embodiment, respectively. Since a basic lens configuration is the same among the Numerical Data Examples 1 to 5, the lens configuration of the embodiment will be described with reference to the lens sectional view of Numerical Data Example 1.

Figure 1:
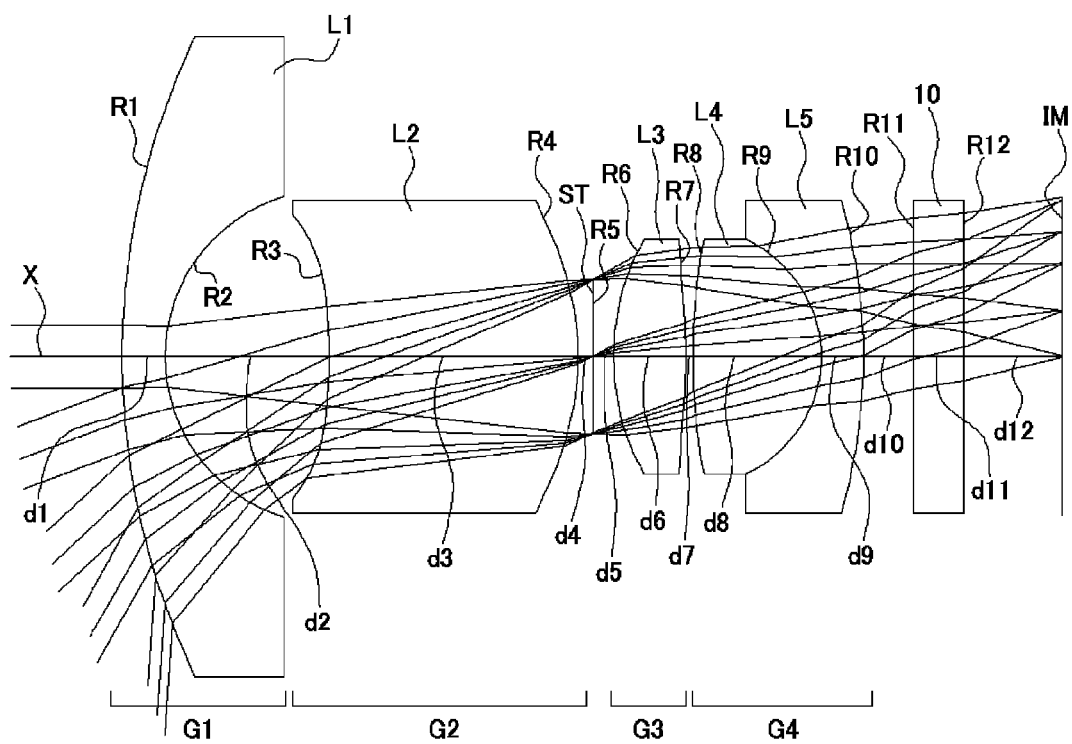
FIG. 1 is a schematic sectional view showing a configuration of an imaging lens in Numerical Data Example 1 according to an embodiment of the invention.

As shown in FIG. 1, the imaging lens of the embodiment has an first lens group G1 having negative refractive power; a second lens group G2 having positive refractive power; an aperture stop ST; a third lens group G3 having positive refractive power; and a fourth lens group G4, arranged in this order from an object side to an image side of the imaging lens. A filter 10 is provided between the fourth lens group G4 and the image plane IM. Here, the filter 10 may be optionally omitted.

The first lens group G1 has strongest refractive power among the all lens groups. The first lens group G1 is composed of a first lens L1 having negative refractive power. The first lens L1 is formed in a shape of a meniscus lens directing a concave surface to the image plane side. Here, the first lens group G1 may be configured by disposing a plurality of lenses having shapes of meniscus lenses directing concave surfaces to the image plane side. Numerical Data Examples 1 and 2 are examples of composing the first lens group G1 using one lens, and Numerical Data Examples 3-5 are examples of composing the first lens group G1 using two lenses. In addition, the lenses to compose the first lens group G1 are not limited to a lens having a shape of a meniscus lens directing a concave surface to the image plane side like the first lens L1 in this embodiment, and may be a biconcave lens directing a concave surface to the image plane side.

The second lens group G2 is composed of a second lens L2 having positive refractive power. The second lens L2 is formed in a shape of a meniscus lens directing a concave surface to the object side. The third lens group G3 is composed of a third lens L3 having positive refractive power. The third lens L3 is formed in a biconvex shape. Here, the shape of the third lens L3 is not limited to the biconvex shape of this embodiment. Numerical Data Examples 1-4 are examples in which the third lens L3 has a biconvex shape, and Numerical Data Example 5 is an example in which the third lens has a shape of a meniscus lens directing a concave surface to the object side.

The fourth lens group G4 is composed of two lenses, a fourth lens L4 having positive refractive power and a fifth lens L5 having negative refractive power, in this order from the object side. Of those lenses, the fourth lens L4 is formed in a shape of a biconvex shape, and the fifth lens L5 is formed in a shape of a meniscus lens directing a concave surface to the object side. According to the embodiment, the fourth lens group G4 is configured as a joined lens in which the fourth lens L4 and the fifth lens L5 are joined. Here, the fourth lens L4 and the fifth lens L5 may be disposed being separated from each other. By separating the lenses from each other, it is possible to use different types of materials for the fourth lens L4 and the fifth lens L5, for example, the fourth lens L4 may be made from glass while the fifth lens L5 may be made from plastic.

The fourth lens group G4 may be any as long as it is composed of two lenses, i.e. a lens having positive refractive power and a lens having negative refractive power, and may be configured by disposing a lens having negative refractive power and a lens having positive refractive power in the order from the object side. Furthermore, the shape of the fourth lens L4 is not limited to a biconvex shape, and may be a shape of a meniscus lens.

Similarly, the shape of the fifth lens L5 is not limited to a shape of a meniscus lens directing a concave surface to the object side. Numerical Data Examples 1, 2, and 5 are examples in which the fifth lens L5 has a shape of a meniscus lens directing a concave surface to the object side, and Numerical Data Examples 3 and 4 are examples in which the fifth lens L5 has a biconcave shape. The shape of the fifth lens L5 can be also a shape of a meniscus lens directing a convex surface to the object side.

Since the fourth lens group G4 has relative smaller refractive power than those of the first lens group G1 to the third lens group G3, the fourth lens group G4 can have negative refractive power. Numerical Data Examples 1, 2, and 5 are examples in which the fourth lens group G4 has positive refractive power, and Numerical Data Examples 3 and 4 are examples in which the fourth lens group G4 has negative refractive power.

The imaging lens according to this embodiment satisfies the following conditional expressions (1) to (7). Therefore, according to the imaging lens of this embodiment, it is possible to attain widening an imaging angle of view and satisfactorily corrected aberrations in the imaging lens.

$$0.3 < f/Fa < 1.0 \tag{1}$$

$$1.0 < F3/f < 6.0 \tag{2}$$

$$-3.0 < F1/f < -1.0 \tag{3}$$

$$2.0 < F2/f < 25 \tag{4}$$

$$0.5 < |fp/fn| < 2.0 \tag{5}$$

$$20 < vdp - vdn \tag{6}$$

$$vdp > vdn \tag{7}$$

In the above conditional expressions,
f: Focal length of the whole lens system
Fa: Composite focal length of a first lens group G1 to a third lens group G3
F1: Focal length of the first lens group G1
F2: Focal length of the second lens group G2
F3: Focal length of the third lens group G3
fp: Focal length of the fourth lens L4
fn: Focal length of the fifth lens L5
vdp: Abbe's number of the fourth lens L4
vdn: Abbe's number of the fifth lens L5

Here, it is not necessary to satisfy all of the conditional expressions. When any single one of the conditional expressions is individually satisfied, it is possible to obtain an effect corresponding to the respective conditional expression.

In the embodiment, each lens has a lens surface that is formed to be an aspheric surface as necessary. When the aspheric surfaces applied to the lens surfaces have an axis Z in the optical axis direction, a height H in a direction perpendicular to the optical axis, a conical coefficient k, and aspheric coefficients $A_4$, $A_6$, $A_8$, and $A_{10}$, a shape of the aspheric surfaces of the lens surfaces may be expressed as follows:

$$Z = \frac{\frac{H^2}{R}}{1 + \sqrt{1 - (k+1)\frac{H^2}{R^2}}} + A_4 H^4 + A_6 H^6 + A_8 H^8 + A_{10} H^{10} \quad \text{[Formula 1]}$$

Next, Numerical Data Examples of the embodiment will be described. In each of the Numerical Data Examples, f represents a focal length of a whole lens system, Fno represents an F number, and ω represents a half angle of view, respectively. In addition, i represents a surface number counted from the object side, R represents a curvature radius, d represents a distance between lens surfaces (surface spacing) on the optical axis, Nd represents a refractive index for a d line, and vd represents Abbe's number for the d line, respectively. Here, aspheric surfaces are indicated with surface numbers i affixed with * (asterisk). For further reference, a sum of the surface spacing from an object-side surface of the first lens L1 (a first lens L1A on the object side in Numerical Data Examples 3 to 5) to an image plane-side surface of the fifth lens L5 is indicated as L15.

Numerical Data Example 1

Basic lens data are shown below.
f = 1.851 mm, Fno = 2.100, ω = 90°
Unit: mm

Surface Data

| Surface Number i | R | d | Nd | vd |
|---|---|---|---|---|
| (Object) | ∞ | ∞ | | |
| 1 | 10.406 | 0.6000 | 1.83500 | 43.0 |
| 2 | 2.350 | 2.3000 | | |
| 3* | −9.641 | 3.5000 | 1.56116 | 56.0 |
| 4* | −3.702 | 0.2000 | | |
| 5 | ∞ | 0.3000 | | |
| 6* | 4.218 | 1.0000 | 1.53116 | 56.0 |
| 7* | −9.297 | 0.1000 | | |
| 8 | 8.785 | 1.8000 | 1.61800 | 63.4 (=vdp) |
| 9 | −1.809 | 0.6000 | 1.84666 | 23.8 (=vdn) |
| 10 | −7.761 | 0.7000 | | |
| 11 | ∞ | 0.7000 | 1.51633 | 64.1 |
| 12 | ∞ | 1.3775 | | |
| (Image Plane) | ∞ | | | |

Aspheric Surface Data

Third Surface k = 0.000000, $A_4$ = −1.573655E−02, $A_6$ = −7.165392E−04

Fourth Surface k = −6.959594, $A_4$ = −1.041797E−02, $A_6$ = 1.084409E−03

-continued

Basic lens data are shown below.
f = 1.851 mm, Fno = 2.100, ω = 90°
Unit: mm

Sixth Surface $k = 0.000000, A_4 = 1.572407E{-}02, A_6 = -1.053072E{-}03$
Seventh Surface $k = -1.850646E{+}01, A_4 = 5.272065E{-}03, A_6 = 1.655956E{-}04$ Fa = 2.309
F1 = −3.762
F2 = 8.837
F3 = 5.606
fp = 2.596
fn = −2.921
L15 = 10.4000

The values of the respective conditional expressions
are as follows:

f/Fa = 0.802
F3/f = 3.029
F1/f = −2.032
F2/f = 4.774
|fp/fn| = 0.889
νdp − νdn = 39.6

Accordingly, the imaging lens of this Numerical Data Example 1 satisfies the respective conditional expressions. Therefore, according the imaging lens of this Numerical Data Example 1, it is possible to satisfactorily correct aberrations while attaining a wider imaging angle of a view.

Figure 2:
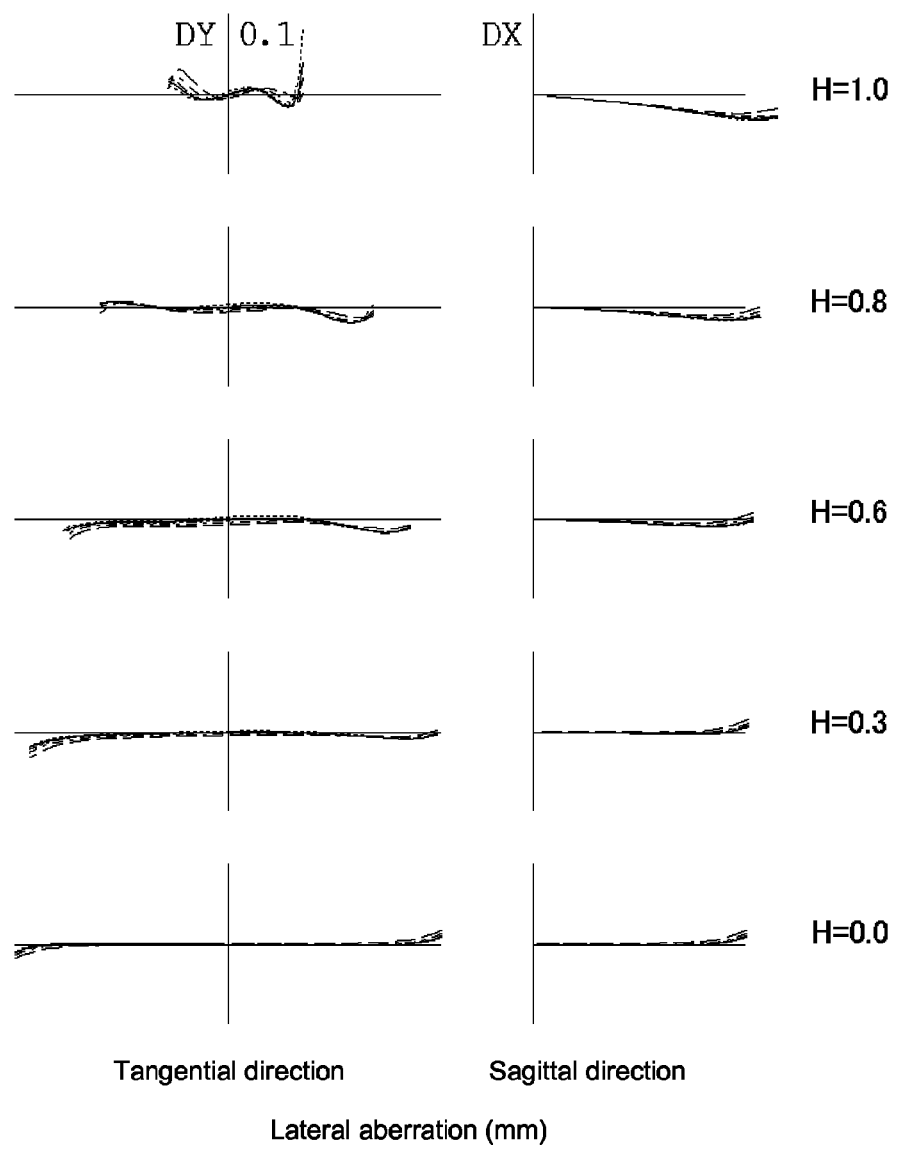
FIG. 2 is an aberration diagram showing a lateral aberration of the imaging lens of FIG. 1.

FIG. 2 shows a lateral aberration that corresponds to a ratio H of each image height to the maximum image height (hereinafter referred to as "image height ratio H") in the imaging lens of Numerical Data Example 1 by dividing into a tangential direction and sagittal direction (which is also the same in FIGS. 5, 8, 11, and 14).

Figure 3:
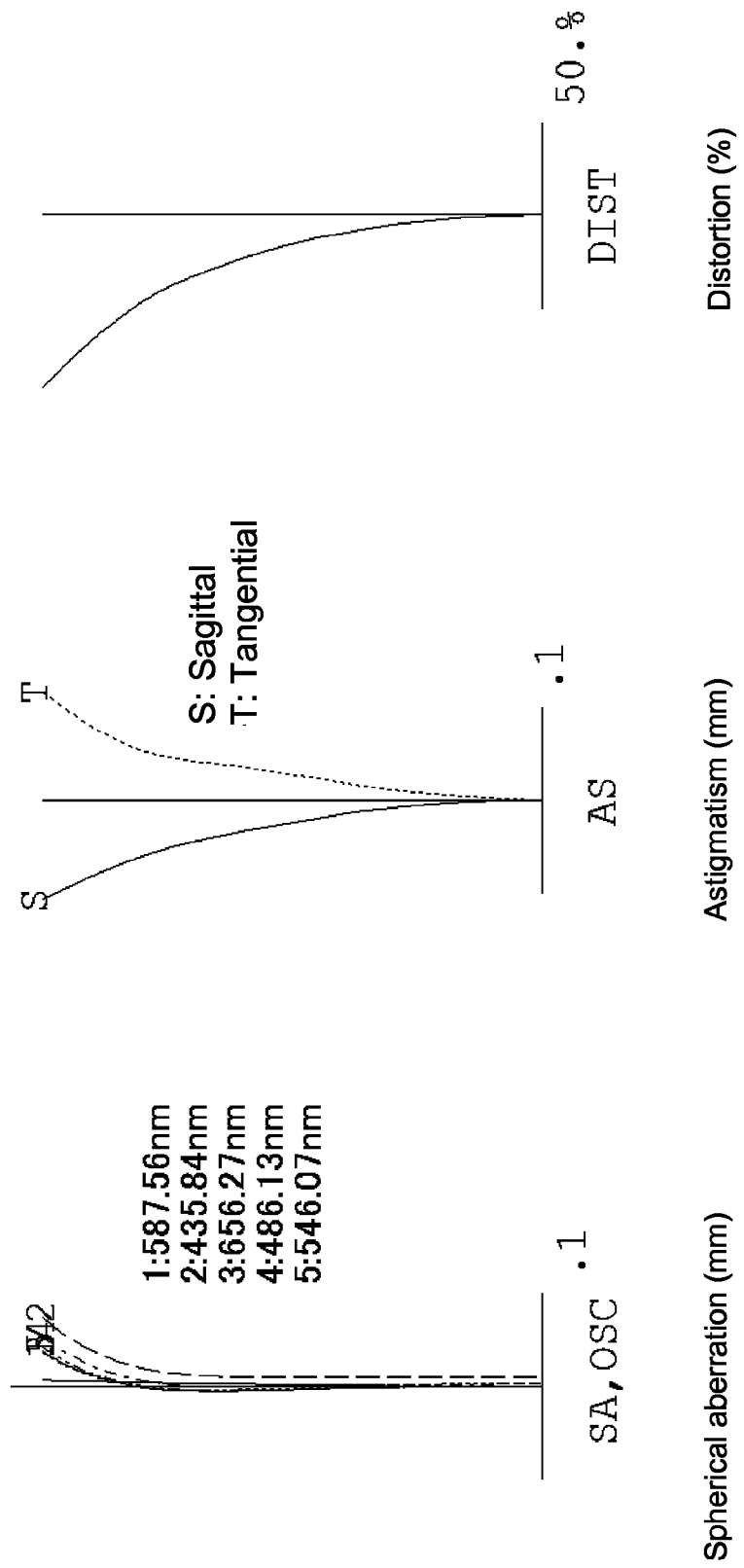
FIG. 3 is an aberration diagram showing a spherical aberration, an astigmatism, and a distortion of the imaging lens of FIG. 1.
Figure 4:
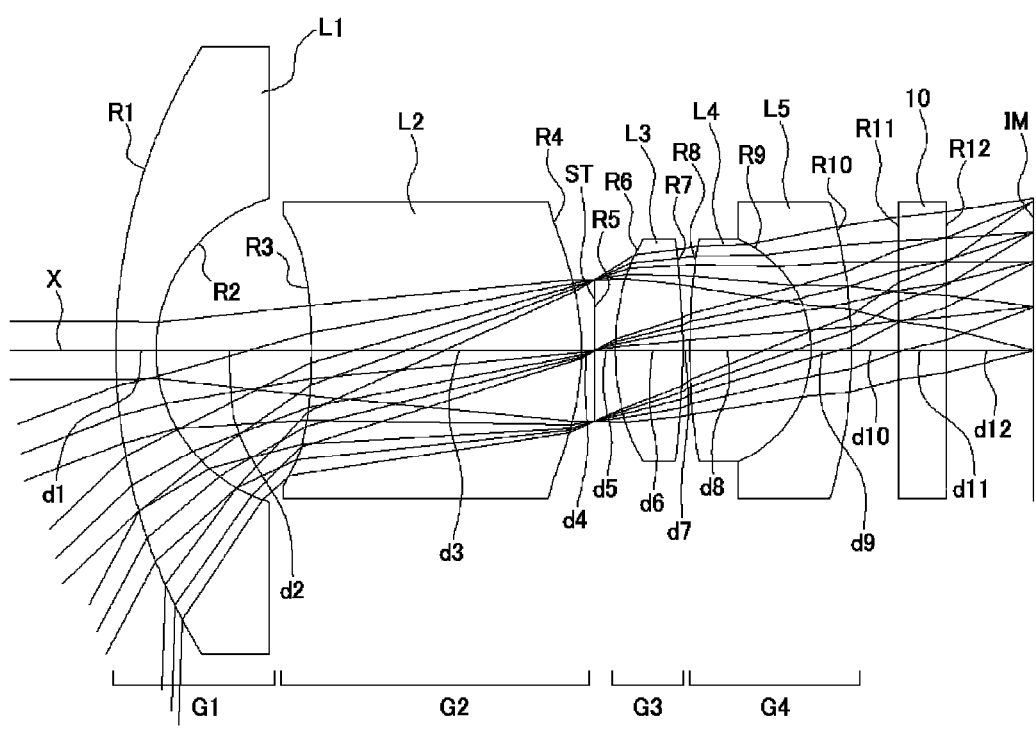
FIG. 4 is a schematic sectional view showing a configuration of an imaging lens in Numerical Data Example 2.

Furthermore, FIG. 3 shows a spherical aberration SA (mm), an astigmatism AS (mm), and a distortion DIST (%) of the imaging lens of Numerical Data Example 1, respectively. In the aberration diagrams, the Offence against the Sine Condition (OSC) is also indicated for the spherical aberration diagram in addition to the aberrations at the respective wavelengths of 587.56 nm, 435.84 nm, 656.27 nm, 486.13 nm, and 546.07 nm. Further, in the astigmatism diagram, the aberration on the sagittal image surface S and the aberration on tangential image surface T are respectively indicated (which are the same in FIGS. 6, 9, 12, and 15). As shown in FIGS. 2 and 3, in the imaging lens of Numerical Data Example 1, each aberration is satisfactorily corrected.

Numerical Data Example 2

Basic lens data are shown below.
f = 1.815 mm, Fno = 2.100, ω = 90°
Unit: mm

Surface Data

| Surface Number i | R | d | Nd | νd |
|---|---|---|---|---|
| (Object) | ∞ | ∞ | | |
| 1 | 8.614 | 0.6000 | 1.83500 | 43.0 |
| 2 | 2.350 | 2.3000 | | |
| 3* | −11.081 | 4.0000 | 1.56116 | 56.0 |

-continued

Basic lens data are shown below.
f = 1.815 mm, Fno = 2.100, ω = 90°
Unit: mm

| | | | | |
|---|---|---|---|---|
| 4* | −3.897 | 0.2000 | | |
| 5 | ∞ | 0.3000 | | |
| 6* | 4.285 | 1.0000 | 1.53116 | 56.0 |
| 7* | −8.991 | 0.1000 | | |
| 8 | 10.117 | 1.8000 | 1.61800 | 63.4 (=νdp) |
| 9 | −1.796 | 0.6000 | 1.80518 | 25.5 (=νdn) |
| 10 | −7.763 | 0.7000 | | |
| 11 | ∞ | 0.7000 | 1.51633 | 64.1 |
| 12 | ∞ | 1.2885 | | |
| (Image Plane) | ∞ | | | |

Aspheric Surface Data

Third Surface $k = 0.000000, A_4 = -1.360019E{-}02, A_6 = -2.089661E{-}04$
Fourth Surface
$k = -6.959594, A_4 = -7.918968E{-}03, A_6 = 1.356892E{-}03$
Sixth Surface $k = 0.000000, A_4 = 1.507522E{-}02, A_6 = -1.598968E{-}03$
Seventh Surface $k = -1.448742E{+}01, A_4 = 4.214448E{-}03, A_6 = -2.560995E{-}04$ Fa = 2.271
F1 = −4.046
F2 = 8.925
F3 = 5.610
fp = 2.619
fn = −3.038
L15 = 10.9000

The values of the respective conditional expressions
are as follows:

f/Fa = 0.799
F3/f = 3.091
F1/f = −2.229
F2/f = 4.917
|fp/fn| = 0.862
νdp − νdn = 37.9

Accordingly, the imaging lens of Numerical Data Example 2 satisfies the respective conditional expressions. Therefore, according the imaging lens of Numerical Data Example 2, it is possible to satisfactorily correct aberrations while attaining a wider imaging angle of a view.

Figure 5:
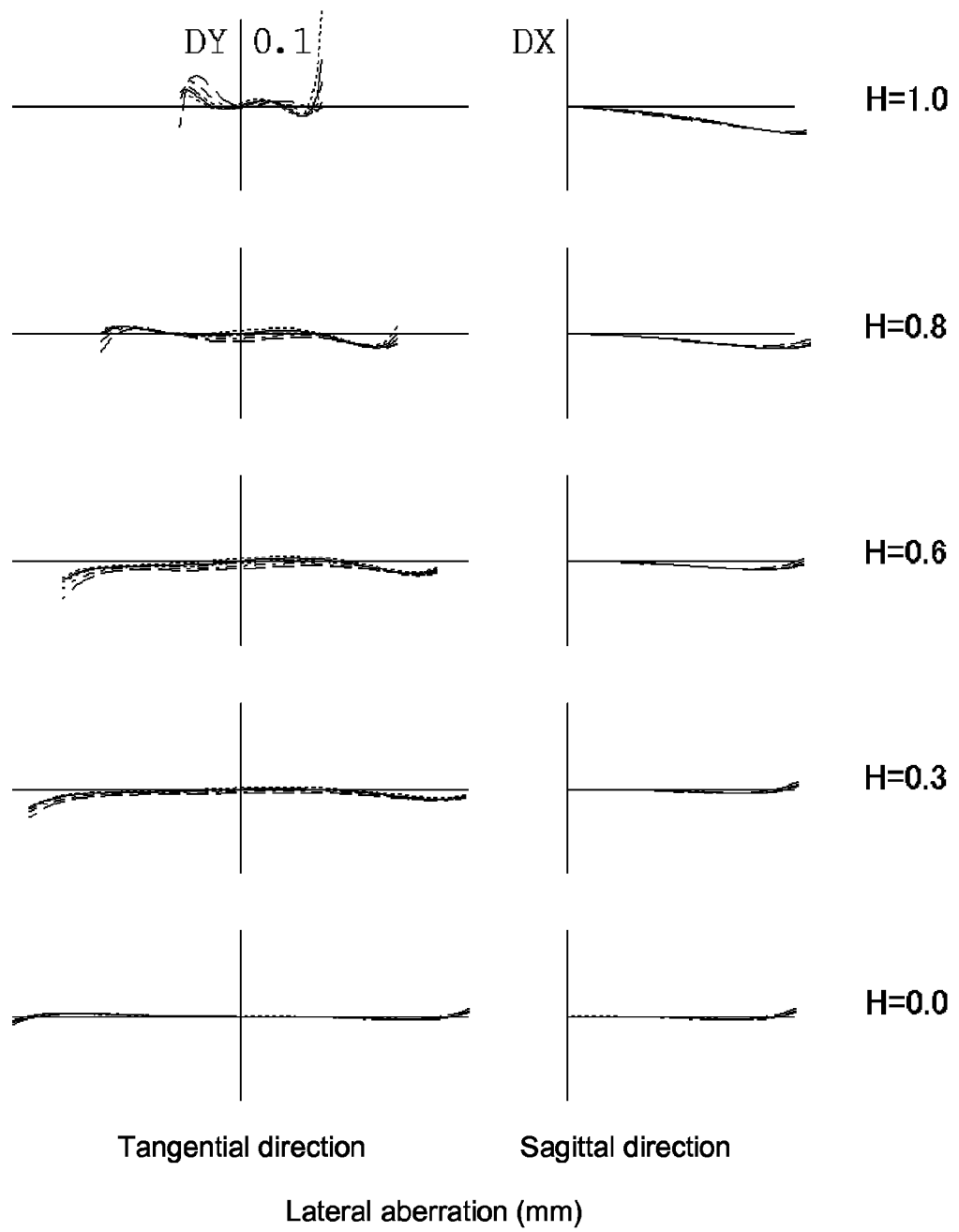
FIG. 5 is an aberration diagram showing a lateral aberration of the imaging lens of FIG. 4.
Figure 6:
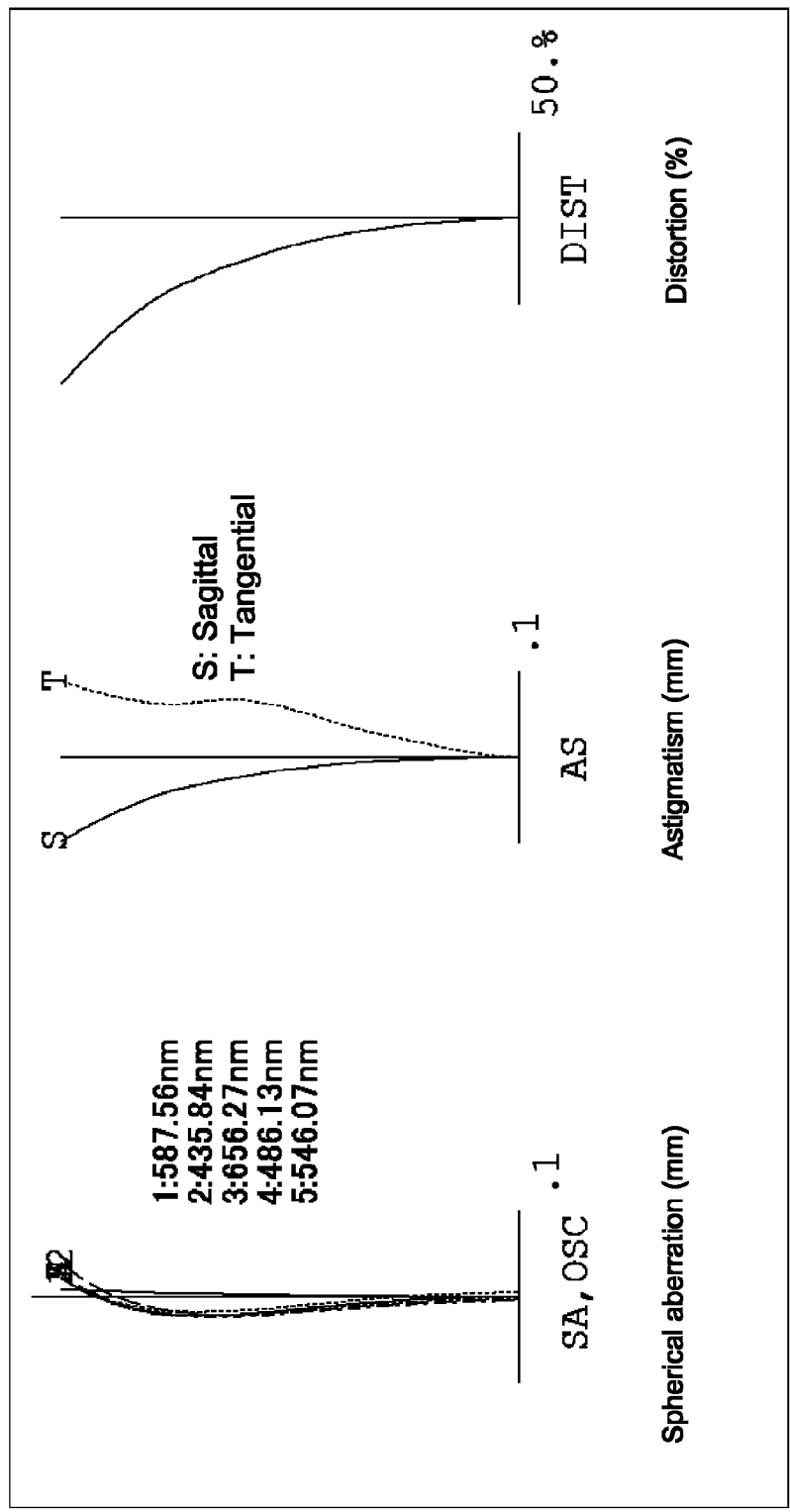
FIG. 6 is an aberration diagram showing a spherical aberration, an astigmatism, and a distortion of the imaging lens of FIG. 4.

FIG. 5 shows a lateral aberration that corresponds to the image height ratio H in the imaging lens of Numerical Data Example 2, and FIG. 6 shows the spherical aberration SA (mm), the astigmatism AS (mm), and the distortion DIST (%), respectively. As shown in FIGS. 5 and 6, also in the imaging lens of Numerical Data Example 2, it is possible to suitably correct the respective aberrations similarly to Numerical Data Example 1.

Numerical Data Example 3

Figure 7:
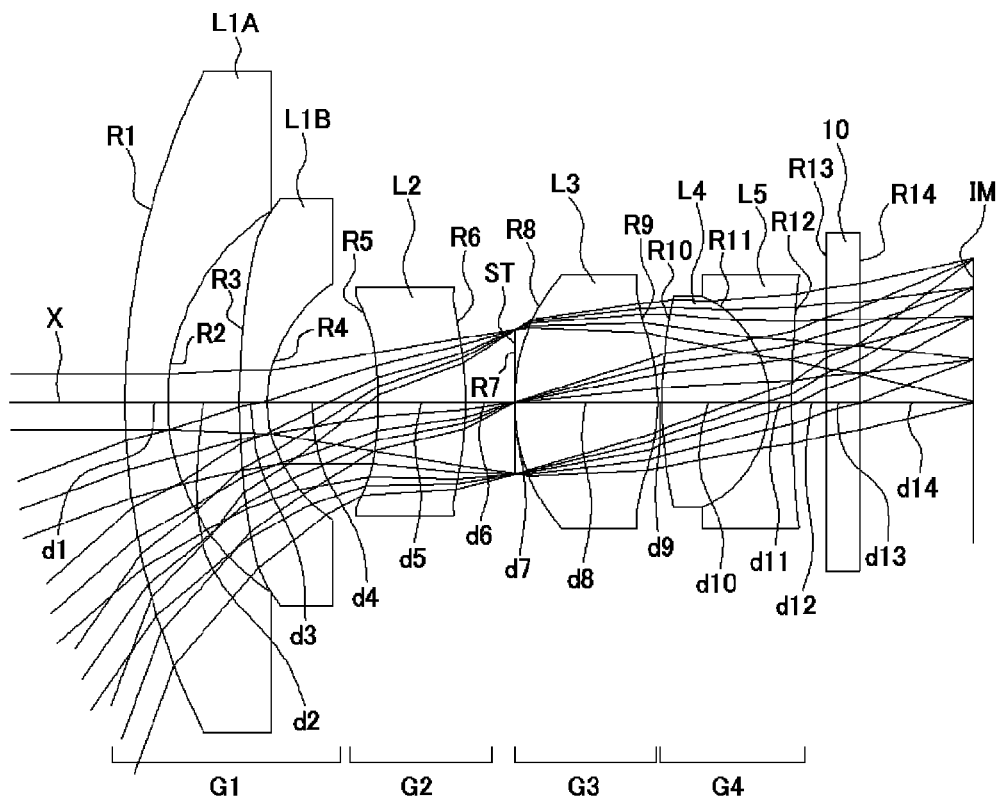
FIG. 7 is a schematic sectional view showing a configuration of an imaging lens in Numerical Data Example 3.

As shown in FIG. 7, according to the imaging lens of Numerical Data Example 3, the first lens group G1 is composed of two lenses, i.e. an object-side first lens L1A and an image plane-side first lens L1B (which will be the same in Numerical Data Example 4 and 5).

Basic lens data are shown below.
f = 2.813 mm, Fno = 2.104, ω = 70°
Unit: mm

Surface Data

| Surface Number i | R | d | Nd | νd |
|---|---|---|---|---|
| (Object) | ∞ | ∞ | | |
| 1 | 17.358 | 1.0000 | 1.58913 | 61.2 |
| 2 | 5.358 | 1.7018 | | |
| 3* | 17.396 | 0.6500 | 1.53116 | 56.0 |
| 4* | 2.958 | 2.6074 | | |
| 5* | −11.000 | 2.0592 | 1.74330 | 49.2 |
| 6* | −9.300 | 1.1813 | | |
| 7 | ∞ | 0.0000 | | |
| 8* | 5.080 | 3.3515 | 1.53116 | 56.0 |
| 9* | −4.616 | 0.1000 | | |
| 10 | 11.615 | 2.5200 | 1.69680 | 55.5 (=νdp) |
| 11 | −2.786 | 0.5500 | 1.80518 | 25.5 (=νdn) |
| 12 | 27.544 | 0.8000 | | |
| 13 | ∞ | 0.8000 | 1.51633 | 64.1 |
| 14 | ∞ | 2.6678 | | |
| (Image Plane) | ∞ | | | |

Aspheric Surface Data

Third Surface $k = 3.769652, A_4 = -1.671065E-03, A_6 = 1.821741E-04, A_8 = -7.449463E-06, A_{10} = 1.534822E-07$ Fourth Surface $k = -2.913131E-01, A_4 = -2.777949E-03, A_6 = 1.082003E-04$ Fifth Surface $k = 3.544000E-01, A_4 = -6.792850E-03, A_6 = -1.130840E-04, A_8 = 5.584450E-05, A_{10} = -2.534975E-06$ Sixth Surface $k = -2.899000E-01, A_4 = -2.234700E-03, A_6 = 3.596900E-04, A_8 = 1.264320E-05, A_{10} = 3.398690E-06$ Eighth Surface $k = -5.530000E-02, A_4 = -9.793910E-05, A_6 = 5.114100E-04, A_8 = -2.040140E-05, A_{10} = -2.016810E-06$ Ninth Surface $k = 0.000000, A_4 = 3.382660E-03, A_6 = 3.973590E-04, A_8 = -3.572210E-06, A_{10} = 3.603303E-06$ Fa = 3.088
F1 = −4.199
F2 = 53.386
F3 = 5.173
fp = 3.474
fn = −3.117
L15 = 15.7212

The values of the respective conditional expressions are as follows:

f/Fa = 0.911
F3/f = 1.839
F1/f = −1.493
F2/f = 18.978
|fp/fn| = 1.115
νdp − νdn = 30.0

Accordingly, the imaging lens of Numerical Data Example 3 satisfies the respective conditional expressions. Therefore, according the imaging lens of Numerical Data Example 3, it is possible to satisfactorily correct aberrations while attaining a wider imaging angle of a view.

Figure 8:
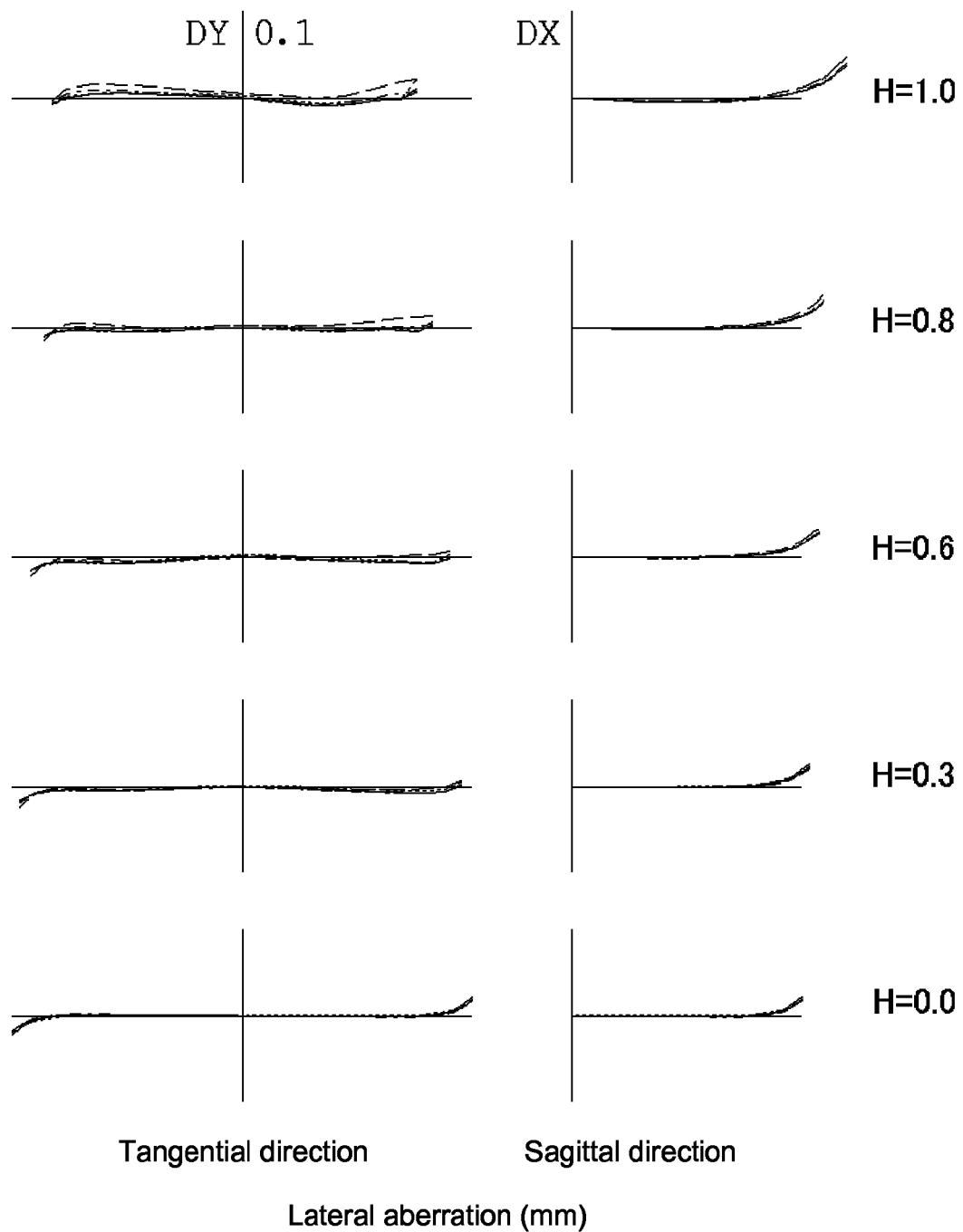
FIG. 8 is an aberration diagram showing a lateral aberration of the imaging lens of FIG. 7.
Figure 9:
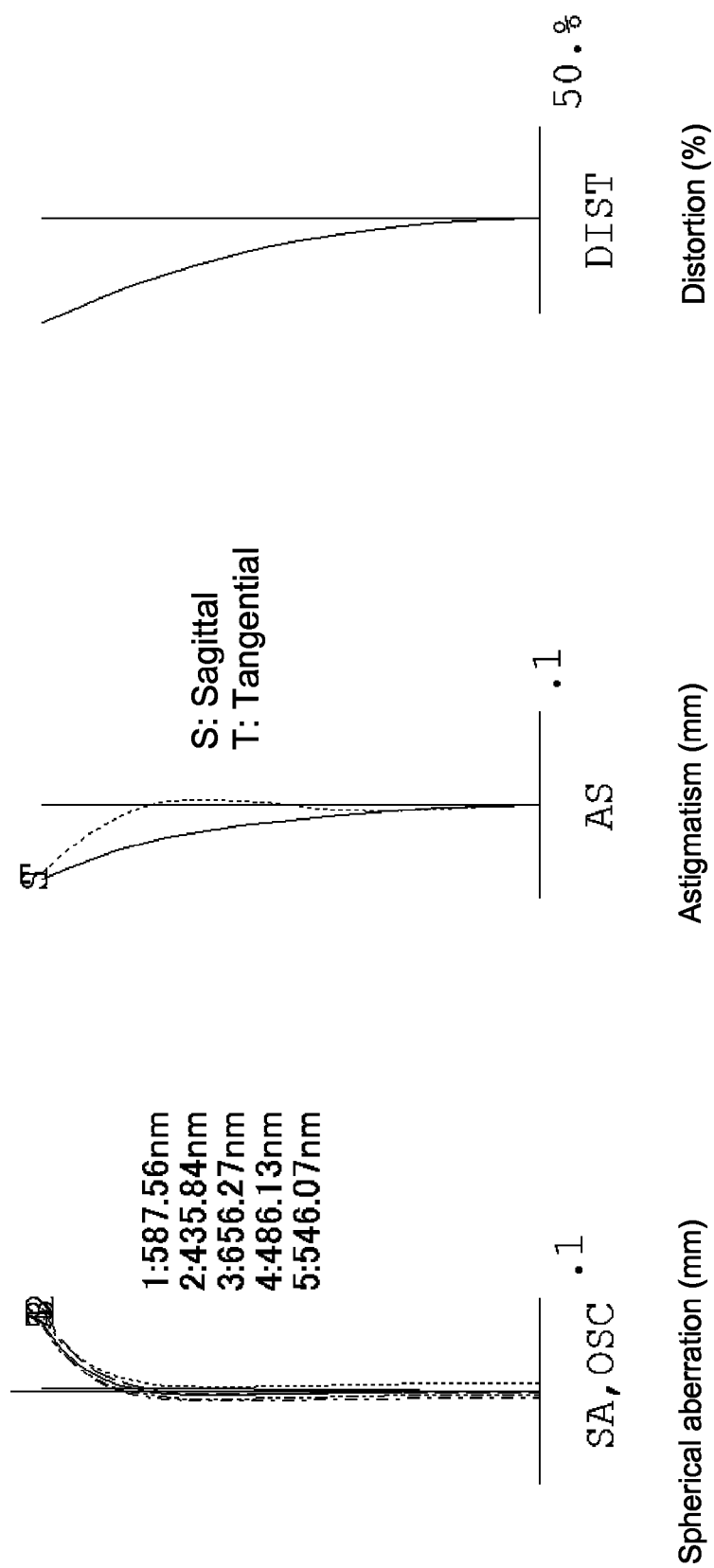
FIG. 9 is an aberration diagram showing a spherical aberration, an astigmatism, and a distortion of the imaging lens of FIG. 7.
Figure 10:
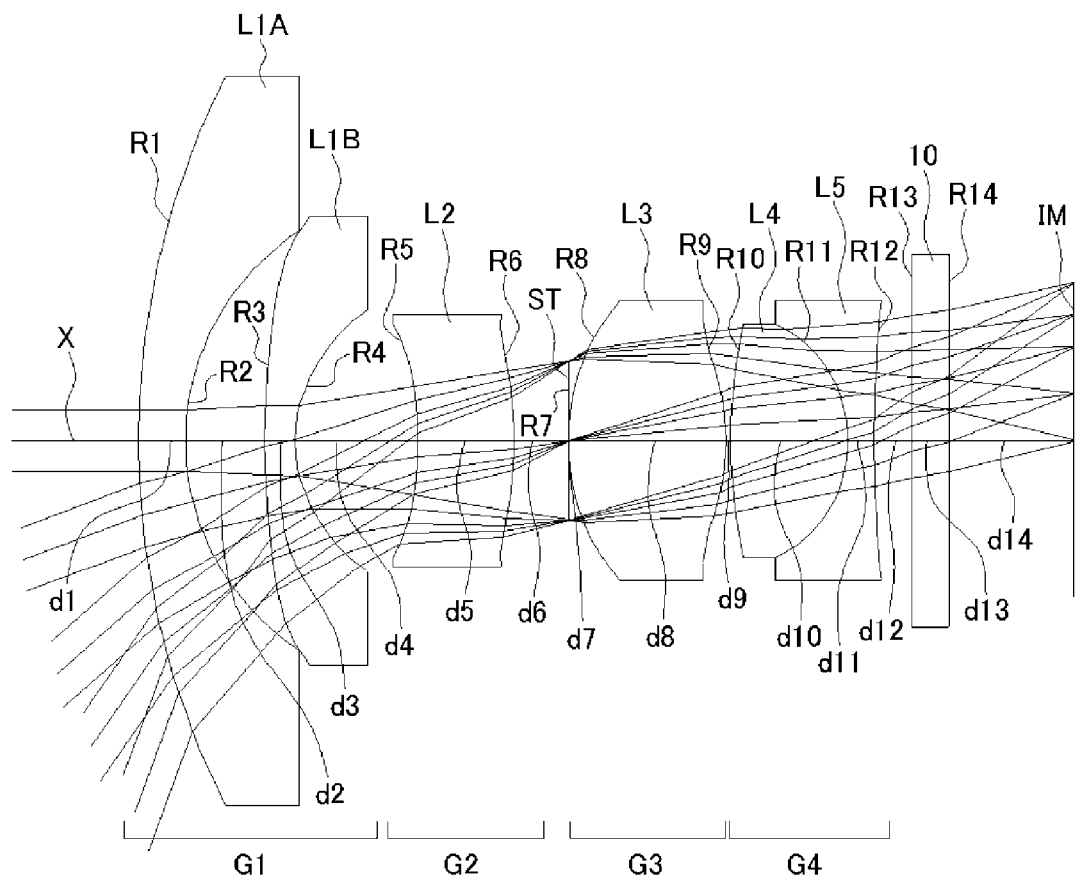
FIG. 10 is a schematic sectional view showing a configuration of an imaging lens in Numerical Data Example 4.

FIG. 8 shows a lateral aberration that corresponds to the image height ratio H in the imaging lens of Numerical Data Example 3, and FIG. 9 shows the spherical aberration SA (mm), the astigmatism AS (mm), and the distortion DIST (%), respectively. As shown in FIGS. 8 and 9, also in the imaging lens of Numerical Data Example 3, it is possible to suitably correct the respective aberrations similarly to Numerical Data Example 1.

Numerical Data Example 4

Basic lens data are shown below.
f = 2.817 mm, Fno = 2.100, ω = 70°
Unit: mm

Surface Data

| Surface Number i | R | d | Nd | νd |
|---|---|---|---|---|
| (Object) | ∞ | ∞ | | |
| 1 | 15.478 | 1.0000 | 1.58913 | 61.2 |
| 2 | 5.358 | 1.7018 | | |
| 3* | 16.801 | 0.6500 | 1.53116 | 56.0 |
| 4* | 2.940 | 2.6074 | | |
| 5* | −9.328 | 2.0592 | 1.62050 | 45.0 |
| 6* | −8.076 | 1.1813 | | |
| 7 | ∞ | 0.0000 | | |
| 8* | 5.077 | 3.3515 | 1.53116 | 56.0 |
| 9* | −4.618 | 0.1000 | | |
| 10 | 11.615 | 2.5200 | 1.69680 | 55.5 (=νdp) |
| 11 | −2.786 | 0.5500 | 1.80518 | 25.5 (=νdn) |
| 12 | 27.544 | 0.8000 | | |
| 13 | ∞ | 0.8000 | 1.51633 | 64.1 |
| 14 | ∞ | 2.6363 | | |
| (Image Plane) | ∞ | | | |

Aspheric Surface Data

Third Surface $k = 1.246419E+01, A_4 = -8.612551E-04, A_6 = 1.542889E-04, A_8 = -7.449463E-06, A_{10} = 1.534822E-07$ Fourth Surface $k = 7.844385E-02, A_4 = -1.973235E-03, A_6 = -6.021815E-05$ Fifth Surface $k = 3.544000E-01, A_4 = -6.792850E-03, A_6 = -1.130840E-04, A_8 = 5.584450E-05, A_{10} = -2.534975E-06$ Sixth Surface $k = -2.899000E-01, A_4 = -2.234700E-03, A_6 = 3.596900E-04, A_8 = 1.264320E-05, A_{10} = 3.398690E-06$ Eighth Surface $k = -5.530000E-02, A_4 = -9.793910E-05, A_6 = 5.114100E-04, A_8 = -2.040140E-05, A_{10} = -2.016810E-06$ Ninth Surface $k = 0.000000, A_4 = 3.382660E-03, A_6 = 3.973590E-04, A_8 = -3.572210E-06, A_{10} = 3.603303E-06$ Fa = 3.052
F1 = −4.312
F2 = 59.500
F3 = 5.173
fp = 3.474
fn = −3.117
L15 = 15.7212

The values of the respective conditional expressions are as follows:

f/Fa = 0.923
F3/f = 1.836
F1/f = −1.531

-continued

Basic lens data are shown below.
f = 2.817 mm, Fno = 2.100, ω = 70°
Unit: mm

F2/f = 21.122
|fp/fn| = 1.115
νdp − νdn = 30.0

Accordingly, the imaging lens of Numerical Data Example 4 satisfies the respective conditional expressions. Therefore, according the imaging lens of Numerical Data Example 4, it is possible to satisfactorily correct aberrations while attaining a wider imaging angle of a view.

Figure 11:
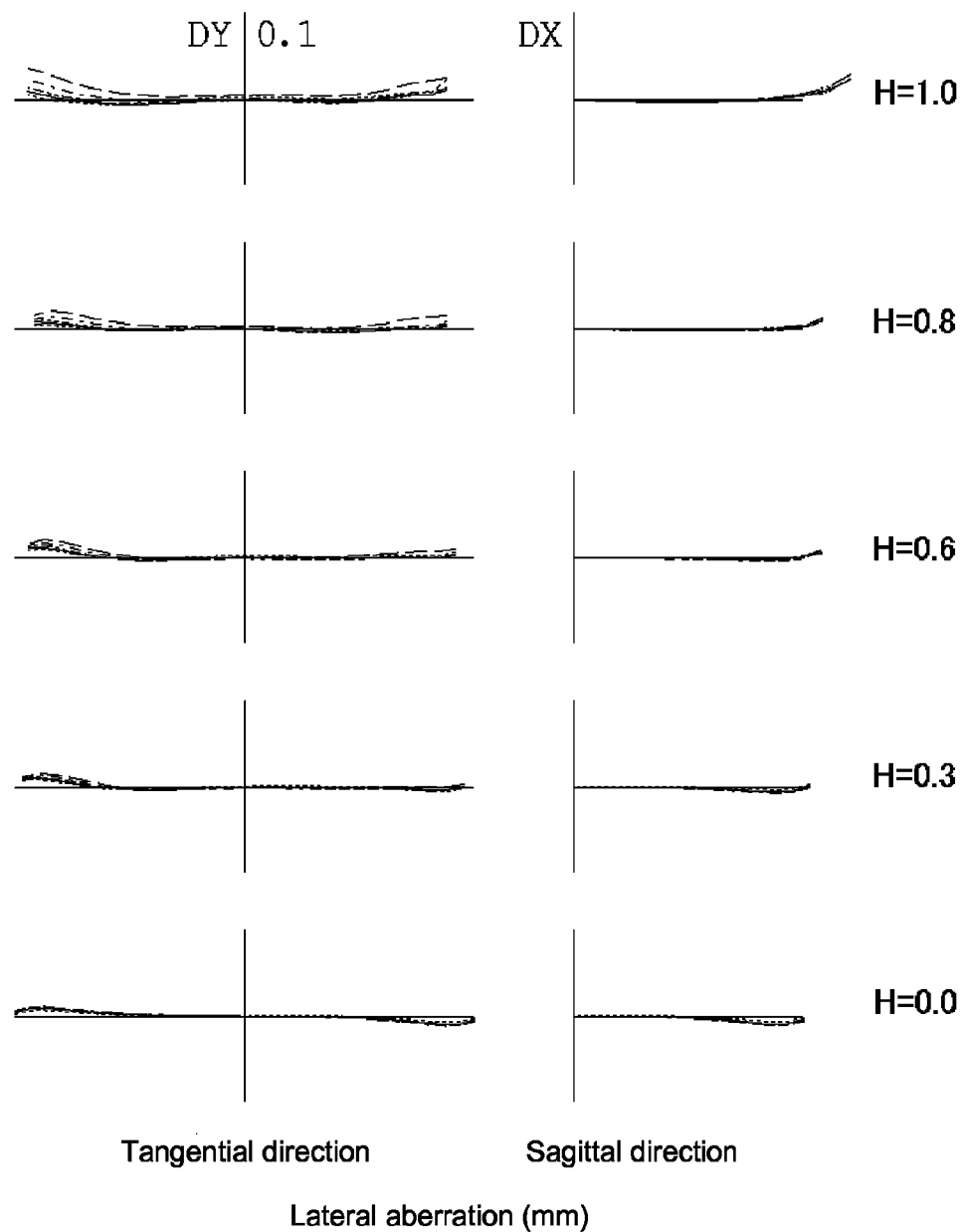
FIG. 11 is an aberration diagram showing a lateral aberration of the imaging lens of FIG. 10.
Figure 12:
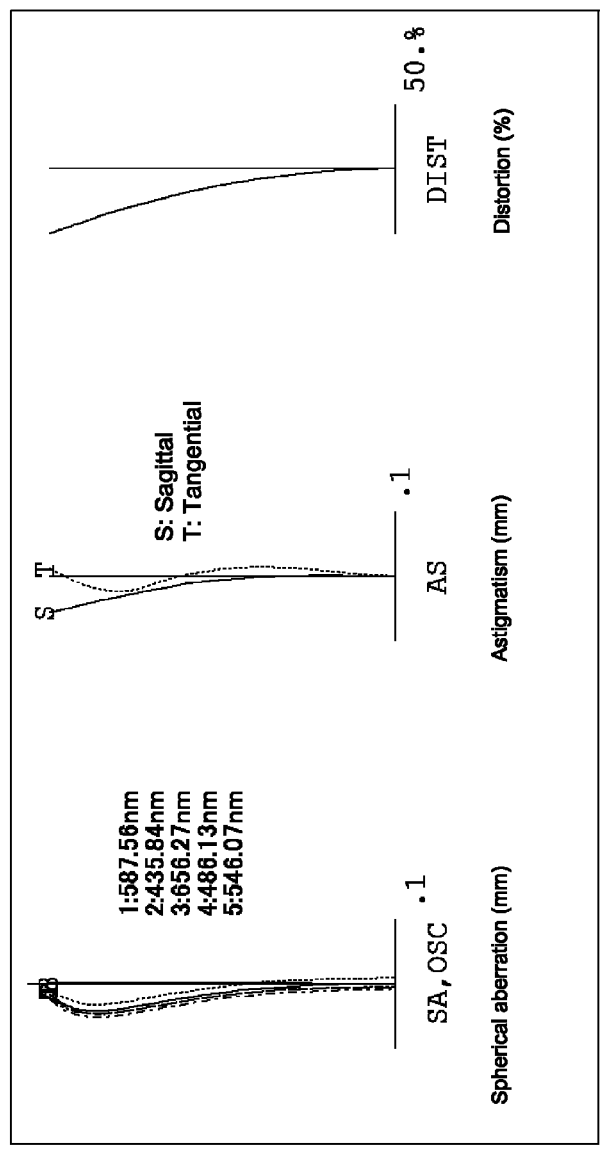
FIG. 12 is an aberration diagram showing a spherical aberration, an astigmatism, and a distortion of the imaging lens of FIG. 10.
Figure 13:
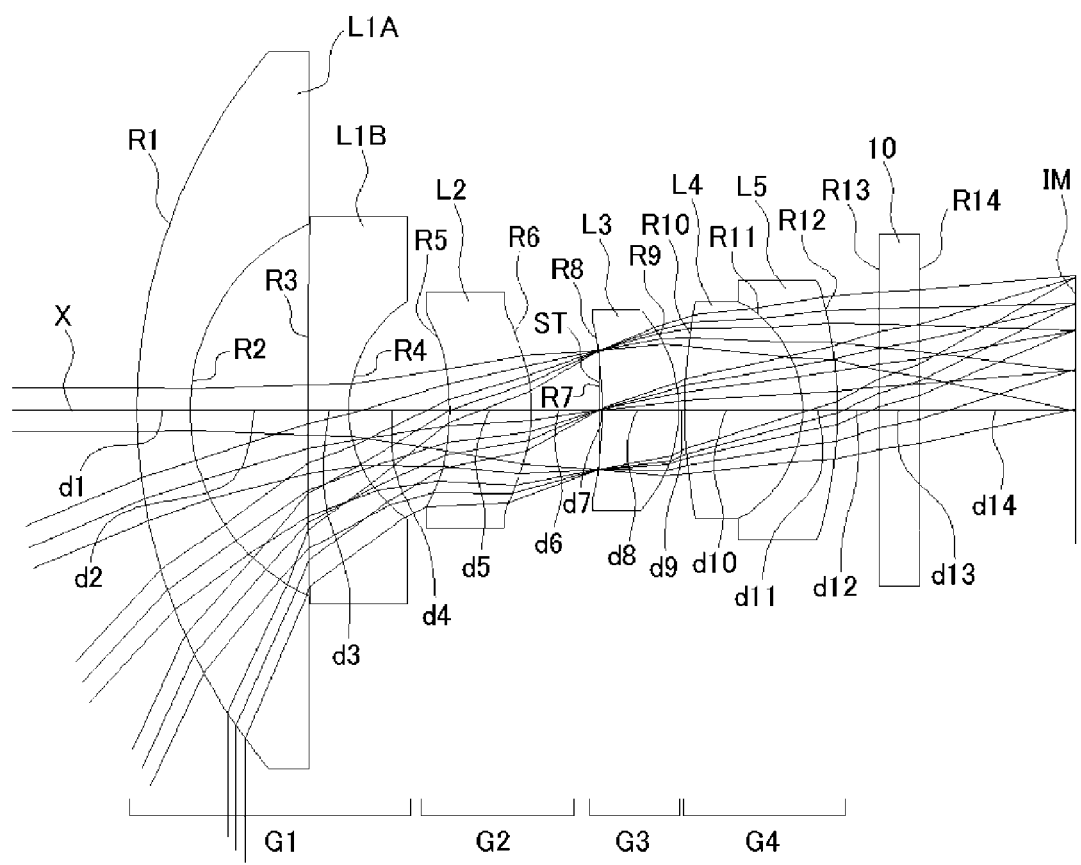
FIG. 13 is a schematic sectional view showing a configuration of an imaging lens in Numerical Data Example 5.

FIG. 11 shows a lateral aberration that corresponds to the image height ratio H in the imaging lens of Numerical Data Example 4, and FIG. 12 shows the spherical aberration SA (mm), the astigmatism AS (mm), and the distortion DIST (%), respectively. As shown in FIGS. 11 and 12, also in the imaging lens of Numerical Data Example 4, it is possible to suitably correct the respective aberrations similarly to Numerical Data Example 1.

Numerical Data Example 5

Basic lens data are shown below.
f = 1.691 mm, Fno = 2.305, ω = 90°
Unit: mm

Surface Data

| Surface Number i | R | d | Nd | νd |
|---|---|---|---|---|
| (Object) | ∞ | ∞ | | |
| 1 | 9.400 | 0.9000 | 1.58913 | 61.2 |
| 2 | 3.500 | 2.0000 | | |
| 3 | 145.694 | 0.7000 | 1.58913 | 61.2 |
| 4 | 2.226 | 1.7100 | | |
| 5* | −4.641 | 1.4000 | 1.61420 | 26.0 |
| 6* | −2.889 | 1.1500 | | |
| 7 | ∞ | 0.0500 | | |
| 8 | −7.445 | 1.3000 | 1.49700 | 81.6 |
| 9 | −2.559 | 0.1000 | | |
| 10 | 9.565 | 2.0000 | 1.69680 | 55.5 (=νdp) |
| 11 | −2.116 | 0.6000 | 1.80518 | 25.5 (=νdn) |
| 12 | −7.339 | 0.7000 | | |
| 13 | ∞ | 0.7000 | 1.51633 | 64.1 |
| 14 | ∞ | 2.6282 | | |
| (Image Plane) | ∞ | | | |

Aspheric Surface Data

Fifth Surface k = 4.219877, $A_4$ = −1.139024E−02, $A_6$ = −7.093122E−04, $A_8$ = 1.037022E−03, $A_{10}$ = 1.171623E−04

Sixth Surface k = −2.522369, $A_4$ = −9.112171E−03, $A_6$ = 4.321147E−04, $A_8$ = 7.222161E−04, $A_{10}$ = 6.192127E−05

Fa = 3.931
F1 = −2.415
F2 = 9.555
F3 = 7.208
fp = 2.674
fn = −3.892
L15 = 11.9100

-continued

Basic lens data are shown below.
f = 1.691 mm, Fno = 2.305, ω = 90°
Unit: mm

The values of the respective conditional expressions are as follows:

f/Fa = 0.430
F3/f = 4.263
F1/f = −1.428
F2/f = 5.651
|fp/fn| = 0.687
νdp − νdn = 30.0

Accordingly, the imaging lens of Numerical Data Example 5 satisfies the respective conditional expressions. Therefore, according the imaging lens of Numerical Data Example 5, it is possible to satisfactorily correct aberrations while attaining a wider imaging angle of a view.

Figure 14:
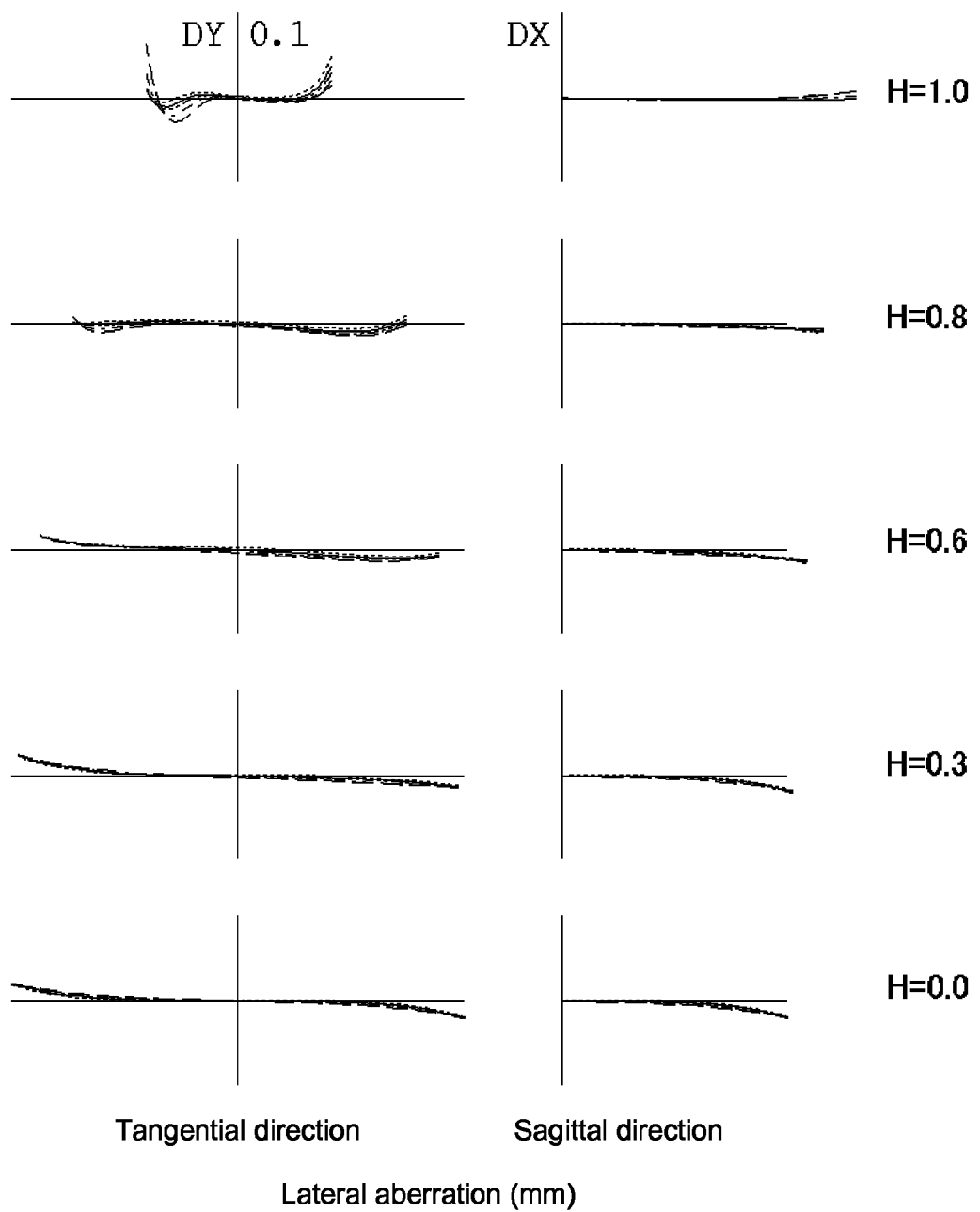
FIG. 14 is an aberration diagram showing a lateral aberration of the imaging lens of FIG. 13.
Figure 15:
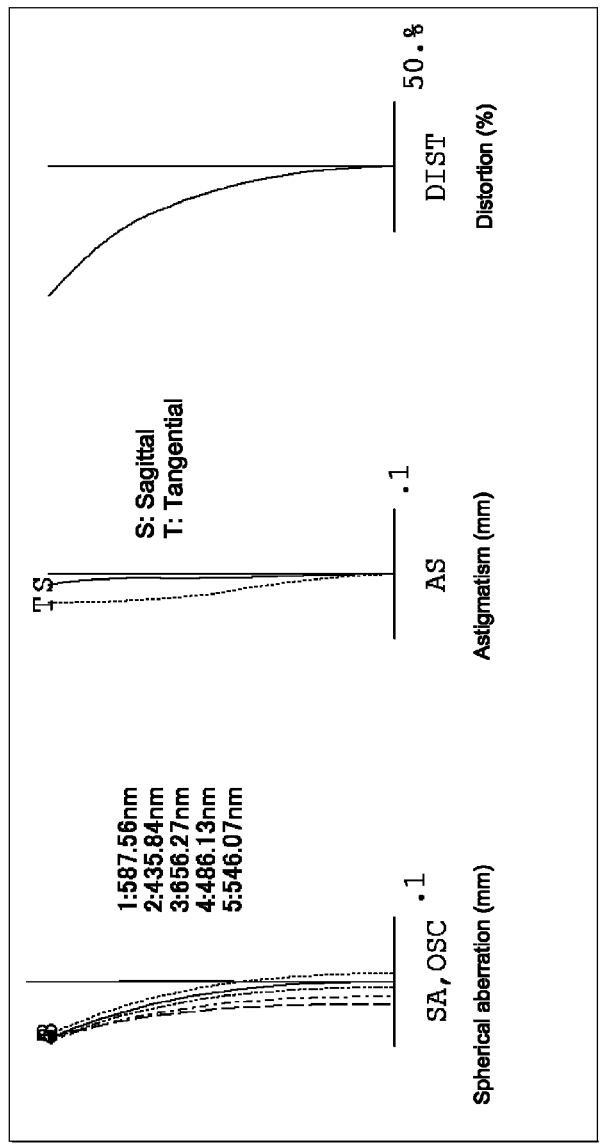
FIG. 15 is an aberration diagram showing a spherical aberration, an astigmatism, and a distortion of the imaging lens of FIG. 13.

FIG. 14 shows a lateral aberration that corresponds to the image height ratio H in the imaging lens of Numerical Data Example 5, and FIG. 15 shows the spherical aberration SA (mm), the astigmatism AS (mm), and the distortion DIST (%), respectively. As shown in FIGS. 14 and 15, also in the imaging lens of Numerical Data Example 5, it is possible to suitably correct the respective aberrations similarly to Numerical Data Example 1.

Here, in the above-described Numerical Data Examples, each lens has a lens surface that is formed to be an aspheric surface as necessary. However, when it is possible in view of the whole length of the imaging lens and required imaging performance, any lens surfaces that compose the imaging lens may be also formed as spherical surfaces.

Accordingly, when the imaging lens of the embodiment is applied to an imaging optical system of a cellular phone, a digital still camera, a portable information terminal, a security camera, a vehicle onboard camera, a network camera, and the like, it is possible to provide a small-sized camera with satisfactorily corrected aberrations while attaining a wider imaging angle of view.

The invention may be applicable to the imaging lens to mount on a device that requires the imaging lens to attain wide imaging angle of view and satisfactorily corrected aberrations, for example, a cellular phone, a security camera, or on-vehicle camera.

The disclosure of Japanese Patent Application No. 2010-249542, filed on Nov. 8, 2010, is incorporated in the application by reference.

While the invention has been explained with reference to the specific embodiments of the invention, the explanation is illustrative and the invention is limited only by the appended claims.

What is claimed is:
1. An imaging lens comprising:
a first lens group having negative refractive power;
a second lens group having positive refractive power;
a third lens group having positive refractive power; and
a fourth lens group, arranged in this order from an object side to an image plane side,
wherein said first lens group has refractive power stronger than that of the second lens group, the third lens group, or the fourth lens group, and includes a first lens having a concave surface facing the image plane sid,
said second lens group includes a second lens having a meniscus lens shape with a concave surface facing the object side,
said fourth lens group includes a third lens having positive refractive power and a fourth lens having negative refractive power, and said imaging lens is arranged to satisfy the following expression when the imaging lens as a whole lens system has a focal length f, and the first lens group, the second lens group, and the third lens group have a composite focal length Fa:

$$0.3 < f/Fa < 1.0.$$

2. The imaging lens according to claim 1, wherein said imaging lens is arranged to satisfy the following relation when the first lens group has a focal length F1:

$$-3.0 < F1/f < -1.0.$$

3. The imaging lens according to claim 1, wherein said first lens group further includes a fifth lens having a meniscus lens shape with a concave surface facing the image plane side.

4. The imaging lens according to claim 1, wherein said imaging lens is arranged to satisfy the following relation when the second lens group has a focal length F2:

$$2.0 < F2/f < 25.$$

5. The imaging lens according to claim 1, wherein, said fourth lens group includes the third lens having a focal length fp and the fourth lens having a focal length fn so that the imaging lens satisfies the following conditional relation:

$$0.5 < |fp/fn| < 2.0.$$

6. The imaging lens according to claim 1, wherein said fourth lens group includes the third lens having an Abbe's number vdp and the fourth lens having an Abbe's number vdn so that the imaging lens satisfies the following conditional relation:

$$20 < vdp - vdn.$$

7. The imaging lens according to claim 1, wherein said fourth lens group includes the third lens having an Abbe's number vdp and the fourth lens having an Abbe's number vdn so that the imaging lens satisfies the following relation:

$$vdp > vdn.$$

* * * * *